United States Patent [19]
Propst

[11] Patent Number: 5,279,503

[45] Date of Patent: Jan. 18, 1994

[54] RAM AIR ELECTRIC DRIVE WATER PUMP

[75] Inventor: Verle Propst, Rochester Hills, Mich.

[73] Assignee: Deco-Grand, Inc., Royal Oak, Mich.

[21] Appl. No.: 791,725

[22] Filed: Nov. 14, 1991

Related U.S. Application Data

[63] Continuation-in-part of Ser. No. 549,742, Jul. 9, 1990, abandoned.

[51] Int. Cl.$^5$ .............................................. F04D 9/02
[52] U.S. Cl. .................................... 417/319; 417/374; 123/41.46; 123/41.49; 192/12 R; 192/103 B; 192/105 BA; 415/123; 415/183; 416/169 A
[58] Field of Search ............... 123/41.44, 41.46, 41.49; 416/169 R, 169 A; 417/319, 350, 355, 374; 415/60, 61, 62, 122.1, 123, 182.1, 183, 202, 203, 224; 192/12 R, 12 B, 103 B, 104 B, 105 BA

[56] References Cited

U.S. PATENT DOCUMENTS

| | | |
|---|---|---|
| 2,019,476 | 11/1935 | Brownlee . |
| 2,753,031 | 7/1956 | Light .................................. 192/12 R |
| 3,693,771 | 9/1972 | De Lancey ..................... 192/103 B |
| 3,906,728 | 9/1975 | Kantz . |
| 3,914,072 | 10/1975 | Rowley et al. . |
| 3,937,192 | 2/1976 | Longhouse ....................... 123/41.49 |
| 3,999,598 | 12/1976 | Fehr et al. . |
| 4,074,662 | 2/1978 | Estes . |
| 4,156,407 | 5/1979 | Moll et al. . |
| 4,215,658 | 8/1980 | Smith, Jr. et al. . |
| 4,469,053 | 9/1984 | Sakurai . |
| 4,475,485 | 10/1984 | Sakakibara et al. . |
| 4,557,223 | 12/1985 | Ngueyen . |
| 4,591,691 | 5/1986 | Badali . |
| 4,630,573 | 12/1986 | Ogawa et al. . |
| 4,643,135 | 2/1987 | Wunsche . |
| 4,651,922 | 3/1987 | Noba . |
| 4,677,941 | 7/1987 | Kurz . |
| 4,691,668 | 9/1987 | West . |
| 4,836,147 | 6/1989 | Morris . |
| 5,078,223 | 1/1992 | Ishiwatari et al. ............... 123/41.49 |
| 5,143,516 | 9/1992 | Christensen ...................... 123/41.44 |

FOREIGN PATENT DOCUMENTS

| | | |
|---|---|---|
| 1235877 | 5/1988 | Canada . |
| 0032880 | 7/1981 | European Pat. Off. . |
| 0323210 | 7/1989 | European Pat. Off. . |
| 0523165 | 4/1931 | Fed. Rep. of Germany ...... 415/203 |
| 3424580 | 11/1985 | Fed. Rep. of Germany . |
| 2281042 | 2/1976 | France . |
| 2377751 | 8/1978 | France . |
| 2519694 | 7/1983 | France . |
| 2608228 | 6/1988 | France . |
| 8904419 | 3/1989 | PCT Int'l Appl. . |

Primary Examiner—Edward K. Look
Assistant Examiner—Christopher M. Verdier
Attorney, Agent, or Firm—Harness, Dickey & Pierce

[57] ABSTRACT

A coolant pump system driven initially by an electric motor in-line with the pump shaft to the pump housing incorporates a ram air-assisted cooling system. The ram air-assisted cooling system includes an electric motor whose rotating shaft drives the primary fan member. A second fan member is located about and connected to the periphery of the primary fan member and is rotated by high velocity air streams purposefully directed at the secondary fan blades. The air which drives the secondary fan member is preferably gathered by one or more air inlet funnels. Typically, two air inlet funnels are equiangularly disposed adjacent the periphery of the secondary fan blade members so that a balanced current of air is swept across the secondary fan blades. A shroud extends over the secondary fan blade members to force the inlet air over the fan blade members.

17 Claims, 5 Drawing Sheets

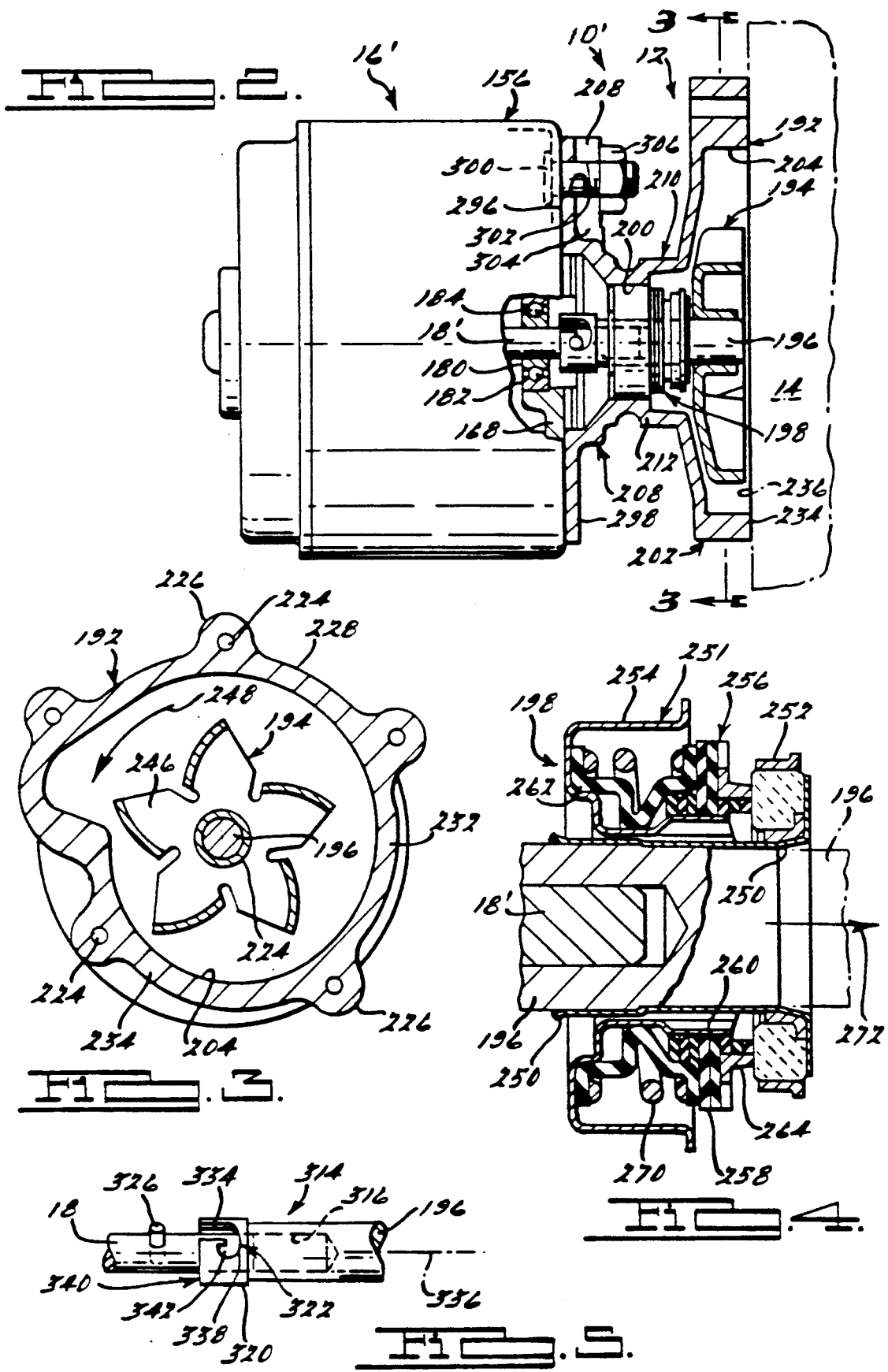

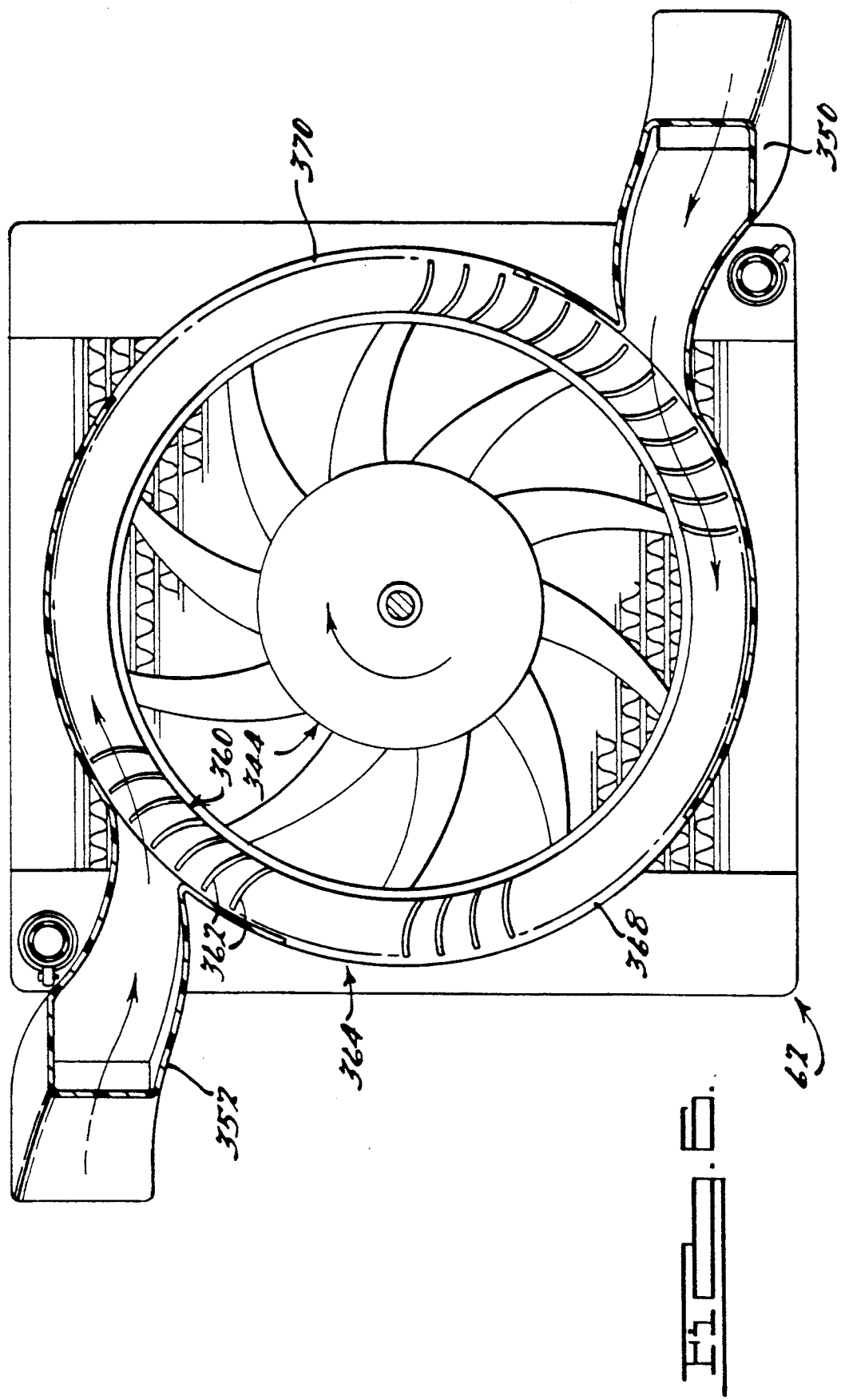

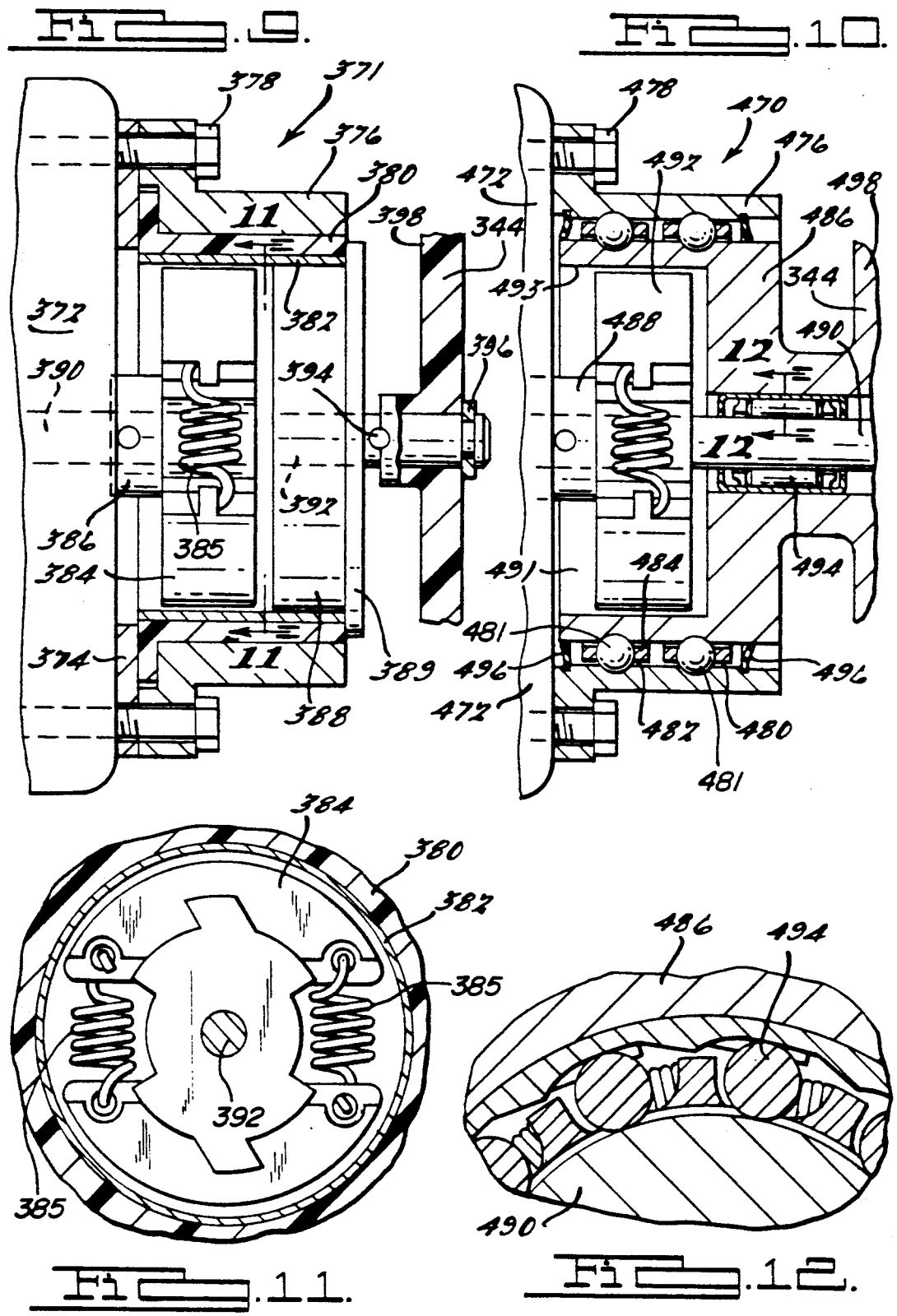

RAM AIR ELECTRIC DRIVE WATER PUMP

Cross-Reference to Related Application

This application is a continuation-in-part of co-pending U.S. patent application Ser. No. 07/549,742 filed Jul. 9, 1990, abandoned and entitled "Electric Drive Water Pump". The disclosure of this co-pending application is incorporated herein by reference.

BACKGROUND OF THE INVENTION

1. Field of the Invention

The present invention relates in general to electrically-driven cooling systems used with internal combustion engines and the like for automotive vehicles and the like, and in particular to electrically-driven, air-assisted cooling systems for use with internal combustion engines in automotive applications.

2. Description of Related Art

In conventional water pump systems used on automobiles, a drive belt and pulley are used to provide the drive rotation to the coolant pump shaft. The coolant may be of any suitable type, such as the commonly used mixture of water and anti-freeze. A gear or chain drive is sometimes used instead of a belt and pulley. A double set of bearings are typically provided in the pump casing to resist the large external side load forces generated by such a pulley, gear or chain drive. As is well known in the art, when these side load forces are considered, the overall forces experienced by the pump shaft are inherently unbalanced. On account of the unbalanced force vector to the pump shaft, it is necessary to suitably strengthen the pump assembly, pump shaft and its ball bearings to handle expected loads and overloads. This adds to the cost and weight of the coolant pump.

The use of the aforementioned side-loaded drive systems also create an additional expense in that the crank shaft or cam shaft of the vehicle must be extended through the engine block wall so that the master drive pulley or gear can be mounted on the shaft. The master drive pulley and belt or gears also add expense and weight to the vehicle's power plant. Passing the crank shaft or cam shaft through the engine block wall also requires that appropriate measures be taken to seal the shaft bearing from environmental contamination such as moisture, dirt and dust, or acidic or salty water sprayed up from road surfaces. A common failure mode for water pumps is the failure or wear of the water pump bearing. Severe bearing wear often results in damage to the flexible coolant face seal assembly, which allows coolant to escape from the engine's cooling system, thus presenting further problems. If the pump bearings did not fail in the first place, many such failures of the flexible face seal assembly could be avoided, along with the resultant loss of engine coolant and destruction of the pump shaft on account of scoring and galling.

Accordingly, it would be very beneficial to provide a direct drive water pump system which solves most, if not all, of the foregoing problems. "Direct-drive" as referred to herein means a drive system that avoids applying external side loads to the pump shaft and bearing set which supports the pump shaft. It would also be useful to eliminate the need to extend the crank shaft or cam shaft outside of the engine block to provide the rotational power required to drive the coolant pump. It would also be desirable to provide a new design for a coolant pump system which can be easily adapted to handle different pumping requirements. It would also be useful to drive both the coolant pump and radiator cooling fan with the same direct-drive system. Finally, it would be beneficial to provide the direct-drive water pump system with an air-assisted cooling fan which reduces the amount of electricity necessary to drive the motor which turns the fan.

In using direct-drive systems as well as virtually all other types of cooling systems a problem arises in that unnecessary electrical energy is expended in driving the cooling fan. While the direct-drive cooling system solves many of the problems associated with water pumps failures, the system still requires electrical energy to operate the motor which drives the cooling fan. This electrical energy however, could be more beneficially spent on other electrical systems throughout the automobile.

In light of the foregoing problems, and in order to fulfill one or more of the foregoing objects and desires, there is provided an air-assisted, electric drive cooling system for use with an automotive vehicle. The system comprises a coolant pump for forcing the circulation of coolant, an electric motor for driving the pump, an air-assisted, electric drive cooling system which reduces the amount of electrical energy utilized in operating the cooling fan and a water pump.

It is another object of the present invention to provide an air-assisted, electric drive cooling system which gives rise to improved auto emissions since the engine would remain at a more constant temperature and therefore burn fuel more efficiently.

It is a further object of the present invention to provide an air-assisted electric drive cooling system which improves the water seal life of the water pump used in the electric drive system by running at lower speeds and by avoiding side loads.

Yet another object is to improve vehicle fuel efficiency and reduce automobile emissions.

SUMMARY OF THE INVENTION

In light of the foregoing problems and in order to fulfill one or more of the foregoing objects and desires,. there is provided a coolant pump for forcing circulation of coolant heated by the combustion engine or batteries of an electric vehicle. An electric motor is provided which rotates the shaft which drives the primary fan member. A secondary fan member is located about the periphery of the primary fan member and is rotated as air is directed over the secondary fan blades. The air which drives the secondary fan member is gathered by one or more air inlet funnels. Typically, two air inlet funnels are equiangularly disposed adjacent the periphery of the secondary fan blade members so that a balanced current of air is swept across the secondary fan blades.

In order to assure that the directed air currents remain directed upon the blades sufficiently long to rotate the second fan member, a shroud extends from the air inlet funnels providing a blanket over the fan blade members. As the air is taken in by the air inlet funnels and passes it travels along the inner walls of the shroud, which is positioned only slightly above the fan blades, thereby forcing the air to remain in contact with the blades causing rotation of the fan member.

When the automobile is traveling at speeds of approximately 40 to 50 m.p.h. or greater, the directed air sweeps across the second fan member blades rapidly enough to cause heat to be dispersed from the coolant such that powered rotation quickly of the first fan member is no longer necessary. When the second fan is rotating enough to sufficiently disperse heat from the coolant, switching means are activated which interrupt the energization of the electric motor to thereby preclude rotation of the primary fan. At low driving speeds such as below 20 mph, the fan is engaged by an electrical clutch or through a centrifugal clutch when the motor is driven at higher speeds, such as above 20 mph. At highway speeds above about 45 mph, the fan will drive the motor shaft and water pump via a one-way clutch and electric power is not needed to drive the motor.

One of the advantages of the air-assisted electric drive cooling system assembly of the present invention is that electric energy is conserved. No longer required to operate the electric motor, the electrical energy can then be utilized by other electrical systems throughout the automobile.

Another advantage of the present invention is that the electric motor should last appreciably longer in that normal wear and tear is reduced over a given period of time.

BRIEF DESCRIPTION OF THE DRAWINGS

The drawings form an integral part of the description of the preferred embodiments and are to be read in conjunction therewith. Like reference numerals designate the same or similar components or features in the various Figures, where:

FIG. 2 is an enlarged partial cross-sectional view of FIG. 1 showing the motor housing, motor shaft, the pump body, the impeller, flexible face seal assembly and the pump shaft;

FIG. 3 is a cross-sectional view of the coolant pump taken along line 3—3 of FIG. 2 showing the location of the impeller within the coolant pump body;

FIG. 4 is an enlarged cross-sectional view of the face seal assembly shown in FIG. 2 taken along the longitudinal axis of the pump shaft;

FIG. 5 is an enlarged fragmentary view of a preferred quick-disconnect coupling mechanism between the drive motor shaft and the pump shaft;

FIG. 6 is a cross-sectional view showing the air-assisted dual fan members and the air inlet funnels;

FIG. 9 is a cross-sectional view of a clutch assembly for use with the ram air fan assembly of the present invention;

FIG. 10 is a cross-sectional view of a second clutch assembly for use with the ram air fan assembly of the present invention;

FIG. 11 is a cross-sectional view taken along line 11—11 of FIG. 9 of a centrifugal clutch assembly; and FIG. 12 is a partial cross-sectional view taken along line 12—12 of FIG. 10 showing the integrally loaded bearing assembly.

DETAILED DESCRIPTION OF THE PREFERRED EMBODIMENTS

The drawings which best demonstrate the newer aspects of the preferred embodiments of the present invention are FIGS. 6 through 12. FIGS. 1-5 are provided to give those skilled in the art a practical example of an electric drive cooling system into which the present invention may be incorporated.

Figure 1:
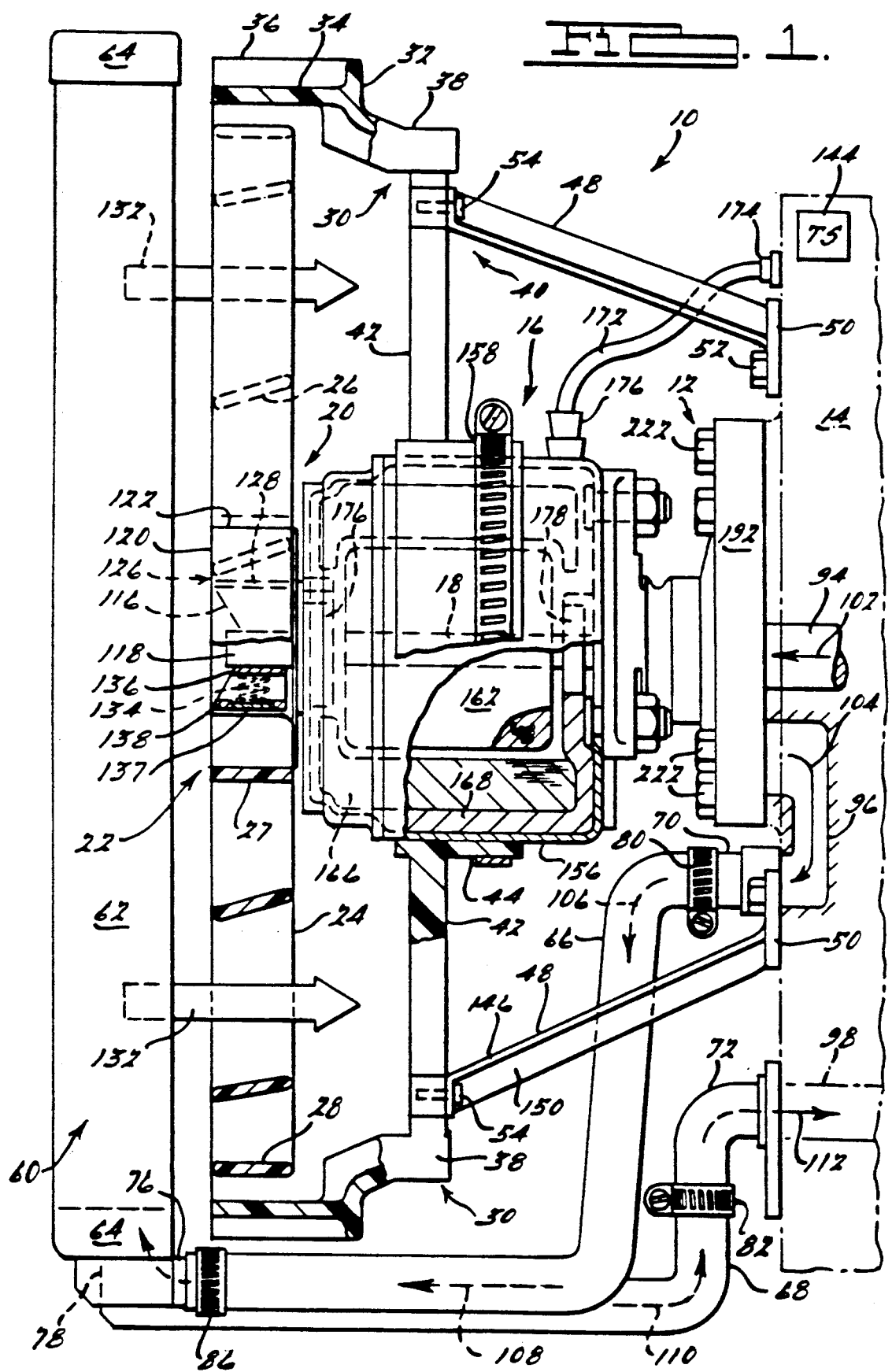
FIG. 1 is a simplified top view of a coolant pump system of the present invention which includes an electric motor (shown in partial cross-section) having a double-ended shaft, one end of which drives the coolant pump of the present invention, and the other end of which drives an engine cooling fan through a clutch assembly.

FIG. 1 is a simplified top view of the coolant pump system 10 of the present invention. The system 10 includes a coolant pump assembly 12 mounted to an engine block 14, an electric motor 16 having a double-ended shaft 18, a cooling fan assembly 20 including a conventional clutch assembly 22 and circular plastic fan 24 having multiple fan blades 26 which may be connected between an inner rim 27 and an optional outer circular rim 28. The system 10 may also include a cooling fan shroud assembly 30 including a cylindrical shroud 32 provided with an outer rim 34, rim-reinforcing ribs 36 and mounting flanges 38. The flanges 38 are connected to a shroud mounting assembly 40 which may include a plurality of spoke-like support members 42 that are equiangularly spaced about an inner rim 44 and that extend radially outwardly to the mounting flanges 38. The mounting shroud also may optionally include stabilizing brackets 48 having mounting pads 50 attached to the engine block 14 by suitable fasteners such as bolts 52 and to the radially-arranged support members 42 by suitable fasteners such as screw 44.

The FIG. 1 cooling system for the engine block 14 also includes a conventional radiator 16 including a core 62 between vertically arranged side manifolds 64. Conventional discharge and return hoses 66 and 68 carry coolant to and from the radiator 60. Suitable piping connections, such as a straight engine discharge pipe 68, a 90-degree elbow discharge return pipe 70 and 90-degree elbow pipes 76 and 78 serving as the radiator inlet and outlet may be used in conjunction with conventional hose clamps 80, 82 and 86 to interconnect the hoses between the radiator 60 and engine block 14. Within the engine block are a coolant pump inlet passage 94, coolant pump discharge passage 96, and radiator return passage 98 which may be formed in the block 14 in any conventional manner. Dashed arrows 102 through 112 show the flow of coolant from inlet passage 94, through the pump assembly 12, into pump discharge line 96, through discharge hose 66 and into radiator 60, and then out return hose 68 to the return passage 98. The coolant is distributed from the passage 98 in conventional manner throughout the engine block through internal passageways which eventually connect to pump inlet passageway 94, thus completing the coolant flow circuit. A conventional thermostatically-operated check valve or diverter valve (not shown), an over-temperature relief valve (not shown), or any other conventional accessory or feature of engine cooling systems may be employed in the overall cooling system depicted in FIG. 1.

The clutch assembly 22 includes an inner rotating section 116 rigidly attached to the end portion 118 of electric motor shaft 18. The clutch 22 also includes an outer rotating section 120 which may have a cylindrical outer surface 122 to which the inner rim 27 of fan 24 is fastened. The clutch assembly 22 includes pressure plates or other engagement mechanisms 126 which upon being actuated squeeze together or otherwise engage at openings 128 to mechanically interconnect inner and outer sections 116 and 120 of clutch 22 so they rotate together. This causes the fan 24 to revolve in the direction of the motor, draws air through the radiator core 62 and blows it into the engine block 14 as indicated by broad arrows 132.

The clutch assembly 22 may be any conventional or suitable type of clutch assembly used in connection with automotive cooling fans. Different types of clutch engagement mechanisms may be used in the clutch 22, including clutch plates thermally-actuated by bimetallic spring assemblies, electromagnetic powder clutch assemblies operated by an electrical signal provided through conventional electrical conductor arrangements, or a centrifugally-operated clutch mechanism. One such suitable clutch mechanism is the Series 60 two-cycle centrifugal clutch assembly available from North American Clutch Corporation of Milwaukee, Wis. The latter mechanism may be as provided in any conventional manner, such as by use of return springs such as spring 134 interconnected between the inner annular ring 136 of the inner clutch section 116 and outer pressure plates 128 mounted between outer annular members 138 of section 116. The springs 134 are sized so that when the rate of rotation of inner section 116 exceeds a predetermined value, the pressure plates 128 engage and cause the fan 24 to rotate. When clutch assembly 22 is centrifugally-operated, the electric motor 16 is preferably a two-speed motor. In this manner, the clutch may be selectively actuated by increasing the speed of motor 16 from its low speed to its high speed, and selectively disengaged by switching the motor 16 from its high speed to its low speed. If a thermally-actuated clutch mechanism is used, the clutch 22 turns on when the air 132 flowing through the cooling fan rises above a certain predetermined temperature. When an electrically-actuated clutch mechanism is used, a temperature switch 144 may be provided on the motor 16, in the engine block 114, or at any other suitable location to provide an on-off electrical signal which controls when the electrically-operated clutch mechanism is engaged and deactivated. Of course, a more sophisticated electrical control circuit which provides other characteristics may be used as well to determine when the fan 24 is made to run and when it will be off.

The fan shroud 30 helps increase the volume of air flow through the radiator core 62 produced on account of the rotation of fan 24. The fan 24 and shroud 30 may be made of conventional sheet metal or suitably high strength, fatigue-resistant, molded plastic.

The high strength plastic or metal used to manufacture the fan 24 and shroud 30 is generally highly resistant to solvents and corrosive materials such as "road salt". Similarly, the mounting structure 44 and support brackets 48 may be made of metal or high-strength plastic which is highly resistant to solvents and corrosives. The brackets 42 and/or brackets 48 may include flat portions, such as portions 146 and 150, at an angle (such as ninety degrees) to one another for increased strength. The inner rim 44 of the mounting structure 40 may be connected to the casing or housing 156 of the motor 16 by any suitable means such as by screws or by a large tubing clamp 158 as shown.

FIG. 1 includes a partially cutaway view of the motor 16. Motor 16 includes an armature assembly including armature windings 162, the motor shaft 18 and a stator assembly 166 rigidly mounted to a motor frame 168 which is enclosed by the housing 156. The motor 116 may be a single-speed motor. If desired or required, a multiple-speed motor, such as a two-speed motor, may be used. A conventional electrical cable 172 with multiple conductors provides the electrical power through electrical connector assemblies 174 and 176 from the vehicle's electrical supply system to operate the motor 172. The motor preferably runs at the nominal vehicle supply voltage provided by the battery, which is typically 12 volts D.C.

The motor 116 also includes two conventional ball bearing sets 176 and 178, which have their outer race pressed or otherwise fastened into suitable cylindrical openings provided in the frame 168 of the motor, and have their inner races pressed or otherwise fastened onto motor shaft 18 so as to retain shaft 18 in place while permitting it to freely rotate. The inner and outer races 180 and 182 and ball bearings 184 of ball bearing set 178 are shown supporting motor shaft 18 in FIG. 2. Those in the art will appreciate that bearing sets 176 and 178 may alternatively employ roller bearings or any other suitable type of bearing device, including sleeve bearings, for securely supporting the motor shaft 18 for easy rotation.

FIG. 2 further illustrates the construction of the coolant pump assembly 12, and shows an alternative electric motor 16' having a single-ended motor shaft 18'. Thus, FIG. 2 represents a second coolant pump system 10' of the present invention. System 10' does not utilize its electric motor to drive the cooling fan. Accordingly, the system 10' need not be located adjacent to the radiator 60 of the vehicle, but instead may be located elsewhere with the vehicle's engine compartment, such as on either side of or the back of the engine block 14. However, the configuration of the coolant pump assembly 12 for the systems 10 and 10' may be the same.

FIGS. 1 and 2 show a preferred construction of the coolant pump assembly 12. The assembly 12 includes a pump body 192, a conventional impeller 194 pressed or otherwise fastened onto a pump shaft 196, and a spring-loaded seal assembly 198 used to prevent coolant from escaping through a cylindrical bore 200 in the pump body.

The pump body 192 has three sections. It includes a coolant cover section 202 which forms the chamber 204 in which the impeller 194 rotates. The pump body 192 also includes an electric drive motor mount section 208 configured to provide complete support for the electric drive motor 16 or 16'. The pump body 192 also includes a central section 210 having a toroidal wall portion 212 which defines the bore 202 that is integrally connected to and disposed between the cover section 202 and motor mount section 208 of the pump body. The pump body 192 as just described is preferably a one-piece metal casting of a suitable material such as aluminum or malleable iron, although it may be any other suitable material, including a high-strength, high-temperature-resistant plastic. The thickness of the various walls or reinforcement members (if any) provided between or within the various sections 202, 208 and 210 of the body 192 will depend upon the type of material, the size and weight of the electrical motor, whether the cooling fan assembly 20 and fan shroud assembly 30 are used, and whether the pump body 192 is the sole structural support for these members or whether reinforcement members such as brackets 48 or the like are provided to secondarily support the motor, or the fan and shroud assemblies. In the embodiment disclosed in FIG. 2, where a fan is not driven by the motor 16', it is preferred to support the electric motor solely by the pump body 192 as shown, since this decreases manufacturing and assembly costs.

FIG. 3 shows a preferred arrangement for the pump body 192 and chamber 204. The pump body may be mounted by several mounting bolts 222 (preferably five in number) which extend through bores 224 on lobes 226 around the periphery 228 of the pump body 192. The wall portions 232 between wall portions 226 are made thick enough to provide the necessary rigidity to prevent coolant from leaking out between the machined flat face surface 234 of the pump body and the corresponding machined flat face 236 of the engine block 14. Conventional gasket material (not shown) may be used to seal any gaps between these two flat machined surfaces.

FIGS. 2 and 3 show a conventional impeller 194, which preferably is of a one-piece metal stamping having an annular inner rim pressed onto the shaft 196. The impeller 194 is preferably balanced about the axis of pump shaft 196 and has equiangularly-spaced blades 246 at the ends thereof to drive the coolant into discharge passage 96 as the impeller 194 rotates in the direction indicated by arrow 248. Suitable impellers are typically manufactured from 1008 through 1016 steel, and may be purchased from A. J. Rose Company of Cleveland, Ohio.

FIG. 4 shows a preferred shaft seal assembly 198, taken in cross-section so as to show portions of the pump shaft 196 and motor shaft 18'. Motor shaft 18' is identical to motor shaft 18 except for not having a second output shaft on the fan side of motor 16'. The assembly 192 typically includes three stamped brass cup members, including a cylindrical cup 250 and large and small annular cups 251 and 252. The outer surface 254 of cup 251 is press-fit into bore 200 of the pump body 192. The seal assembly 198 also includes a layered stack 256 of annular gaskets 258 arranged as shown to form a sliding surface with the inside cylindrical wall portion 260 of large cup 250. Flexible seal members 262 and 264 complete the sealing arrangement between the larger cup 250 and smaller cup 252. A squat helical wire spring 270 is disposed as shown about flexible annular seal 262, and serves to press the smaller cup 252 and pump shaft 196 in a direction away from the motor, as indicated by arrow 272. Face seal assemblies, such as the seal assembly 198 shown in FIG. 4, have long been used in automobile coolant pumps, and may be purchased from a number of companies, such as John Crane Company of Morton Grove, Ill. However, we are unaware of any such seal assemblies used to help keep a pump shaft and drive shaft together in the manner as set forth according to the teachings of the present invention.

FIGS. 1 and 2 show that the motor 16 or 16' has an end mount configuration. In other words, the generally cylindrical end face 296 of the motor 16 facing the pump body 192 is connected to a suitable mounting flange 298 of the mount section 208 of the pump body 192 through the use of suitable fasteners, such as threaded bolt studs 300, anchored in the housing 156 and frame 168 of the motor 16. The studs 300 pass through slightly larger holes 302 in reinforced regions 304 of the mount section 208 of pump body 192. Suitable fasteners such as locking nuts 306 are tightened down on the studs 300. Theoretically, only one mounting connection need be made between the housing of the motor 116 and the mount section 210 of the pump body, if it were strong enough to properly support the electric motor and prevent deflection thereof as the motor generates torque through the shaft. However, as best shown in FIG. 1, two or preferably three (or more) connection members like studs 300 are spaced around the periphery of the mount section 210.

The electric motor 16 may be set to rotate at a fixed speed or may be driven by a suitable electric drive system so as to have variable speed. As previously explained, a simple two-speed motor is preferred. For example, the low speed might be set to rotate at 2400 rpm and provide roughly 60 liters per minute of coolant flow at normal pressures within the cooling system, and may have a high speed of 3000 rpm which may provide approximately 85 liters per minute of coolant flow. By selecting different impeller sizes and/or designs and different electric motor sizes and/or designs known in the art, the capacity and pressure of the pump system and the rate of rotation of the motor and pump shaft of the present invention may be varied as desired for any given cooling application for an internal combustion engine.

FIGS. 2 and 5 show a preferred method of connecting the electric motor drive shaft 18 to the pump shaft 196. The pump shaft 196 is preferably larger in diameter than the motor shaft, thus permitting the coupling end portion 314 thereof to have a socket 316 machined or otherwise formed therein. The rim portion 320 of the socket end 314 may be enlarged to provide further strength for the bayonet slot 322 which is formed therein.

FIG. 5 is an enlarged fragmentary view of the pump end of the motor shaft 18 and the socket end portion 322 of the pump shaft 196. The motor shaft 18 includes a transverse pin 326 which is pressed or otherwise placed into a corresponding hole pre-drilled into the shaft 18. The pin fits into the bayonet slot 322 which includes a linear portion 334 running substantially parallel to the axis 336 of the pump shaft 196 and an arcuate portion 338. Portion 338 begins near an inward end of the linear portion 334, extends transversely away therefrom, and curves back toward the outward end 340 of the socket 316 to form a recessed area 342 to receive and captivate the pin 326 on the shaft 18. The helical spring 270 of the shaft seal assembly 198 shown in FIG. 4 biases the coupling into the recessed area 342. The electric motor 16 drives the pump impeller 194 in one direction only, as shown by arrow 248 in FIG. 3. Thus the coupling mechanism of the present invention illustrated in FIGS. 2 and 5 inherently tends to remain coupled together, since there are no significant forces which tend to uncouple it during operation of the coolant pump systems 10 or 10'. Thus, those in the art will appreciate that the coupling mechanism shown in FIGS. 2 and 5 constitutes a direct-drive coupling means for connecting the pump shaft 196 to the electric drive motor. Shafts 18 and 196 are coaxially aligned, and due to the close fit and interlocking relationship between the male portion of motor shaft 18 and the female end portion 322, the two shafts effectively operate as one rigid shaft. Since the motor shaft 18 is amply supported on both ends by bearing sets 176 and 178 which are sized to accommodate the additional load presented by pump shaft 196, the pump shaft 196 does not need to have its own set of bearings within the coolant pump body as is found in conventional coolant pumps in automotive applications. In other words, the coolant pump system 10' shown in FIG. 2 is a bearingless coolant pump system, and the flexible shaft seal assembly 198 may be said to be a bearingless means located at least partially within the bore of the pump body for forming a leak-resistant, flexible seal between the central portion of the pump shaft and the bore 200 of the pump body. This design may also be used in the FIG. 1 pump system, or if desired, a ball-bearing set may be disposed in bore 200 of pump body 192.

Those in the art will appreciate that other direct-drive coupling means may be employed to coaxially interconnect the pump shaft 196 and motor shaft 198. Further, it will be appreciated that the motor shaft 198 could be elongated sufficiently to also serve as the pump shaft 196. However, an important advantage of the direct-drive coupling mechanism described with respect to FIGS. 2 and 5 is that it allows the first and second connection portions rigidly mounted to the motor shaft and pump shaft to be quickly interconnected to permit the motor 16 to drive the impeller 194, and to be quickly disconnected from one another. Further, these interconnections may be made by hand by simply grabbing the impeller 194 by one hand and pushing it in a direction opposite arrow 272 of FIG. 4 while simultaneously rotating the impeller 194 in the direction of arrow 248. This will retract pin 326 from the recessed area 342 of bayonet slot 332, and orient it in linear slot portion 334, which permits the two shafts to be disconnected. Such easy connection and disconnection of the coupling members should serve to reduce assembly and component replacement costs, and to permit faster and easier replacement of the water pump or electric motor, should this prove necessary in the field.

Figure 7:
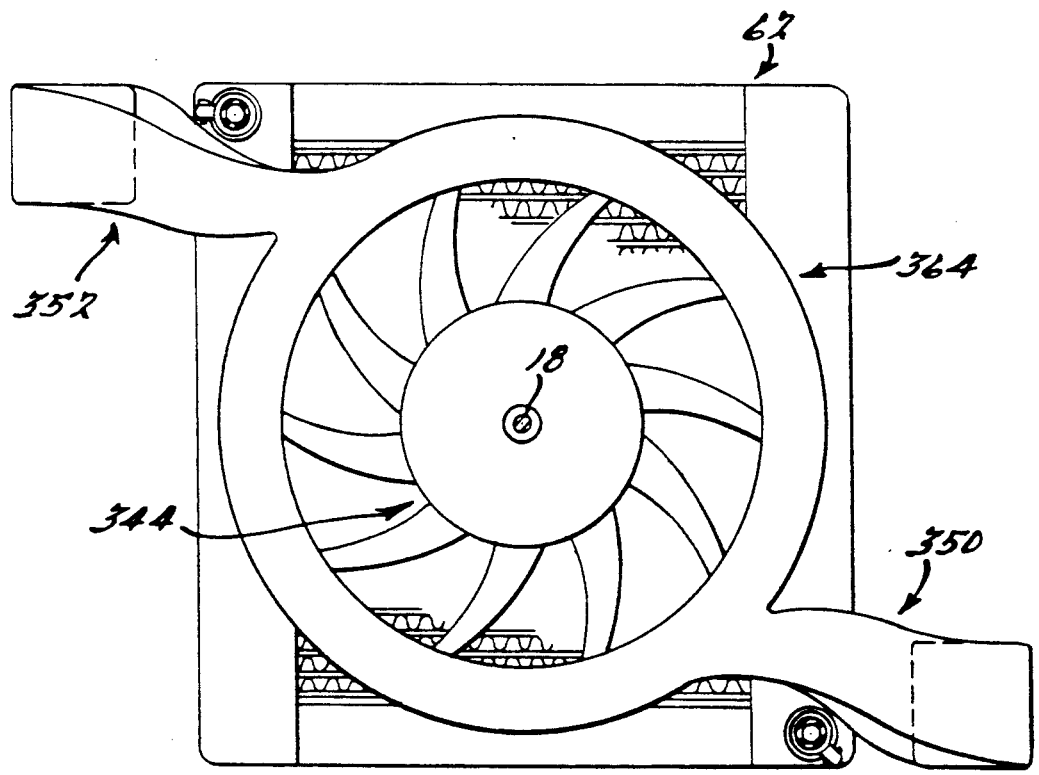
FIG. 7 is a frontal view of the primary fan member and the air inlet funnels.

Referring to FIGS. 6 and 7, a cross-sectional and frontal view showing the air-assisted dual fan members and the shroud and air inlet funnel assembly is provided. When the automobile is traveling at speeds below approximately 45 mph, the first fan member 344 and the rigidly interconnected second fan member 360 which is disposed circumferentially around the first fan member are rotated by the electric motor 16 of FIGS. 1 and 8. Rotation of the second fan member 360 begins to be assisted by the laminar air flow entering air inlet funnels 350 and 352 when the automobile is traveling at approximately 20 mph. As the traveling speed increases due to the laminar air flow being directed over the fan blades 362 the rotation of this second fan member 360 also increases. At traveling speeds over approximately 45 mph, the second fan member 360 rotates with sufficient velocity to disperse enough heat from the coolant contained in the radiator core 62 that rotation of the first fan member 344 by the shaft 18 of motor 16 is no longer necessary.

As air is gathered by air inlet funnels 350 and 352, it is directed over the slightly concave fan blades 362 of the second fan member 360 which results in fan rotation. The air inlet funnels 350 and 352 are provided with a wide cross-sectional area along a first section at the point of air intake and gradually taper down along the intermediate section to the end section which helps the air flow stay laminar in nature. Once the air has entered funnels 350 and 352, the air current becomes compressed into relatively orderly layers such that the velocity of the air current increases as the air layers become increasingly compact. The air flow is expected to be laminar in nature even when the air speed at the inlet funnels is over 30 miles per hour.

The air inlet funnels 350 and 352 are equiangularly spaced to provide balanced force vectors produced by the currents of air at opposite ends of the second fan member 360. The first section of each funnel having the wide cross-sectional areas generally extend alongside the radiator and the tapered end of each inlet funnel is preferably an extension of the shroud 364 which extends over the periphery of the blades 362 of the second fan member 360. The shroud 364 forces the air gathered by the inlet funnels to remain over the blades 362 sufficiently long to cause continual rotation of the second fan member. Both the shroud 364 and the air funnels 350 and 352 may be made of conventional sheet metal or suitably high-strength, fatigue resistant, molded plastics which are resistant to solvents and other corrosives such as "road salt".

The shroud 364 is provided with air escape hatches 368 and 370 which allow the air introduced through the air inlet funnels to exit the semi-enclosed shroud. This ensures that a continuous air current sweeps over the blades 362 forcing the fan member 360 to rotate. Each of the air escape hatches 368 and 370 are generally relatively long openings on the sides of the shroud which allows the air circulated within shroud 364 to escape at a rate equivalent to or greater than the rate at which the air enters funnels 350 and 352. The air escape hatches 368 and 370 are located proximate to each of the inlet funnels 350 and 352 such that a majority of the air inlet through funnel 350 escapes from shroud 364 through hatch 368 just before the circulating air would mix with air entering shroud 364 through inlet funnel 352. Likewise, a majority of the air inlet through funnel 352 escapes from shroud 364 just before the circulating air would mix with air entering shroud 364 through inlet funnel 350. The air inlet funnels 350 and 352 are shown to curve around the radiator toward the automobile grille (not shown) where the air funnels gather the air.

Figure 8:
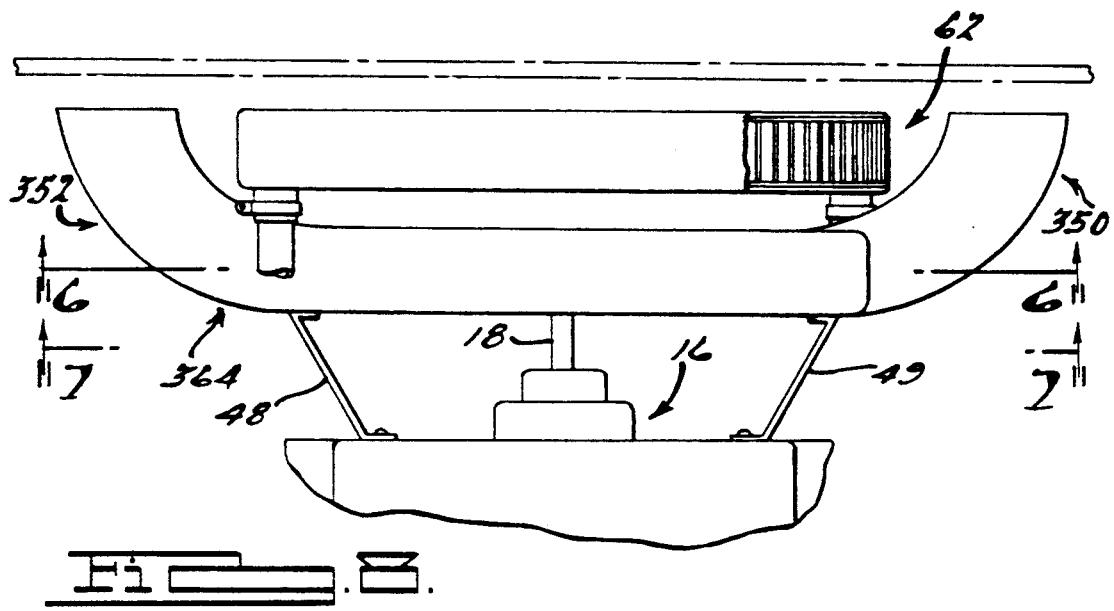
FIG. 8 is a simplified top view of the electric motor engaging the primary fan which is covered by the shroud from which the air inlet funnels extend.

FIG. 8 shows a simplified top view of the electric motor 16 engaging the primary fan via the motor shaft 18. Stabilizing brackets 48 and 49 are attached at one end to the shroud 364 and at the other end to the electric motor casing. By attaching the brackets 48 and 49 at one end to the shroud 364 and at the other end to the electric motor casing the shroud 364 moves relative to any movement of the motor 16 which is mounted to the vehicle's frame.

FIG. 9 shows a cross-sectional view of a clutch assembly 371 for use with the ram air fan assembly of the present invention. The clutch assembly 371 includes a thrust washer 374 located adjacent to the motor casing 372 and a housing 376 attached to the thrust washer 374 by bolts 378. Within the housing 376 is a sleeve bearing 380 such as an OILITE bearing No. FF-2501 having an inner diameter lined with a thin layer of sheet metal 382. When the shaft 390 extending from the motor is rotated with sufficient velocity, the centrifugal clutch 384 including springs 385 engage the thin layer of steel 382. The inner diameter of the adapter 386 is attached to the shaft and the outer diameter is attached within the central bore of the centrifugal clutch 384. The fan member 398 which is attached to the second shaft 392 by a pin 394 and is further secured on the second shaft 392 by a snap ring 396 which extends through the bushing 388 having a flange plate 389. The flange plate 389 is adhered to the outer lip of the bearing.

FIG. 10 shows a cross-sectional view of a second clutch assembly for use with the ram air fan assembly of the present invention. The clutch assembly of FIG. 10 includes a housing 476 which is attached directly to the motor casing 472 by bolts 478. Within the housing 476 are two conventional ball bearing sets 480 wherein the outer surfaces 482 of the ball bearings 481 are in contact with the housing 476 and the inner surfaces 484 of the ball bearings 481 are in contact with an extension 486 of the first fan member 344 of the fan assembly 498. The shaft 490 which extends from the motor has an adapter 488 attached at a first end which precludes the centrifugal clutch 492 from coming in contact with the motor casing 472. The adapter 488 extends into the axial bore of the centrifugal clutch portion 492 to allow the centrifugal clutch portion to rotate therewith. At a second end the shaft 490 extends through a one-way braking mechanism 494 such as a Torington drawn cup clutch. The one-way clutch 494 as shown in more detail in FIG. 12 is integrally loaded to resist thrust as the fan assembly 498 is rotating. Seals 496 are provided between the housing 476 and the extending fan portion 486 to prevent dirt and other undesirable material from entering the clutch assembly.

The operation of a preferred embodiment of the air assisted cooling system of the present invention with a centrifugally-operated clutch mechanism as shown in FIGS. 9 and 10 used in association with a two-speed motor will now be described in further detail. When the vehicle is traveling below a first predetermined speed, such as approximately 20 mph, or the engine coolant is above a first predetermined temperature, the electric motor is run at its high speed. With specific reference to FIG. 9, when the motor is run at high speed the drive shaft 392 is rotated with sufficient velocity to overcome the force of springs 385 thereby causing the outer surfaces of the centrifugal clutch 384 to engage the inner rim 382 of the sleeve bearing 380. This in turn causes the fan assembly to rotate in a predetermined direction. The adaptor 386 which serves as a spacer between the motor casing 372 and the clutch assembly 384 it is integrally attached to the shaft 390 such that the adaptor rotates with the shaft.

Likewise, with reference to FIG. 10 when the motor is run at high speed the drive shaft 490 is rotated with sufficient velocity to overcome the force of springs 485 such that the outer surfaces of the centrifugal clutch 492 engage the inner diameter 493 of bore portion 491 thus allowing the fan assembly to rotate. The adaptor 488 also serves as a spacer to preclude the centrifugal clutch 492 from coming in contact with the motor casing 472. Under both the embodiments of FIGS. 9 and 10 when the electric motor is run at high speed such that the drive shafts rotate a relatively high velocities, rotation of the fan assemblies provide for maximum cooling. traveling at speeds above the first pre-determined speed, or when the coolant is below the first pre-determined temperature, maximum cooling is not required. Thus, the motor can be run at its low speed, which will operate the water pump, but is not fast enough to cause the centrifugal clutch to engage. (The springs provided on the centrifugal clutch are selected so that the centrifugal clutch is disengaged when the electric motor is rotating at a speed below the high speed of the motor, such as the low motor speed.) At speeds above a second pre-determined speed, such as approximately 45 mph, or when the engine coolant is below a second pre-determined temperature (much lower than the first), the electric motor is not required to drive the water pump and thus the motor can be turned off. The fan members will then be rotated by the ram air directed over the second fan members. When the vehicle is being operated at or above the second pre-determined speed, the one-way clutch 494 will engage when the ram air causes the fan blade members to turn, thereby causing the motor shaft to turn, which in turn will drive the water pump.

In an alternate embodiment where only a single speed motor is used, it is contemplated that only a "one-way" clutch mechanism need be provided. In such an embodiment, at vehicle speeds below a pre-determined speed (such as approximately 45 mph) or at coolant temperatures above a pre-determined temperature, it is desirable to have the electric motor run to turn the fan blades for forced-air cooling. However, at a speed above this pre-determined speed or at a temperature below a pre-determined temperature the electric motor can be turned off, since the ram air causes the one-way clutch to become engaged and thereby turns the motor shaft, which drives the coolant pump.

Another advantage of using the electrically-driven water pump assembly of the present invention is that the conventional thermostat used in automobile cooling systems may be eliminated if desired. To prevent localized hot spots in the engine, the coolant pump can simply be turned on and off at regular predetermined intervals, thereby assuring that the coolant in any given location does not overheat. Further, overall energy consumption by the pump assembly can be minimized if a coolant temperature sensor is utilized in the control circuit which turns the electric motor used to drive the pump assembly on and off. In particular, when the coolant is relatively cool, the motor need not be run any more than necessary to avoid localized hot spots in the engine block.

Yet another advantage of the present invention is that the coolant pump assembly can be kept on using battery power even after the internal combustion engine has been turned off. This may be advantageous, particularly on very hot days, since the engine of a vehicle can be cooled off more evenly and quickly than by other known methods. For example, in some domestic vehicles which use an electrically-driven fan, the fan is kept on after the engine is turned off, for as long as five or ten minutes. However, the air flow created by the fan really only helps directly cool the exterior portions of the engine nearest the fan. In contrast, by using an electric drive motor to power a water pump, the present invention makes it possible to take full advantage of the much more efficient liquid coolant system of the vehicle, even when the internal combustion engine is turned off. Thus, the present invention allows the engine to be cooled much more evenly and quickly than when only an electrically-driven fan is used to cool an engine which has just been turned off, since the coolant can be continuously circulated between the engine and the radiator.

From the foregoing description, it should be evident to those in the art that an important advantage of using the air-assisted, electrically driven cooling system of the present invention is that electrical energy will be conserved by eliminating the expenditure necessary to operate the electric motor at times when the natural flow of air due to vehicle movement is sufficient to operate the coolant pump.

The foregoing detailed description shows that the preferred embodiments of the present invention are well suited to fulfill the objects above-stated. It is recognized that those skilled in the art may make various modifications or additions to the preferred embodiments chosen to illustrate the present invention without departing from the spirit and proper scope of the invention. For example, the mounting arrangement for the electric motor upon the coolant pump body may be varied, by providing different numbers of and locations for the fasteners or different types of fasteners. Also, different quick-disconnect coupling arrangements for the shaft of the electric motor and pump shaft may be provided. A single-speed electric motor may be provided in place of the two-speed motor, and the cooling fan clutch may be eliminated.

The air assisted coolant pumping system of the present invention may also be used with automotive vehicles powered by electric batteries. In such situations, it is at times useful to provide a pump for the circulation of a heat transfer fluid such as, but not limited to, conventional coolants or antifreeze, for various purposes. For example, a conventional antifreeze or coolant mixture may be used for heating the passenger compartment, heating and/or cooling the batteries, or distributing the heat produced in the electric drive motor(s) or in the batteries during operation to heat exchanges or radiators. It is contemplated that in certain embodiments or vehicles or configurations of first fan members, enough air would be striking the primary fan members so that use of the secondary fan members would be unnecessary. Still other variations to the preferred embodiments of the present invention are possible. Accordingly, it is to be understood that the protection sought and to be afforded hereby should be deemed to extend to the subject matter defined by the appended claims, including all fair equivalents thereof.

What is claimed is:

1. An air-assisted, electric drive cooling system for a self-propelled vehicle having an internal combustion engine, comprising in combination:
    pump means for forcing circulation of coolant heated by the engine;
    electric motor means, having a motor shaft, for driving the pump means;
    means for sensing coolant temperature;
    a dual acting fan structure to assist in dispersal of heat from the coolant, said fan structure including a first fan member having a plurality of first fan blades driven by and rotatable about the motor shaft extending from the electric motor means and a second fan member rigidly interconnected to said first fan member about the periphery of said first fan blades, said second fan member including a plurality of second blades rotatable about the motor shaft for driving the motor shaft upon application of at least one directed current of air to said second fan blades; and
    means for gathering moving air to create the directed current of air applied to the second fan blades which drives the fan structure.

2. An air-assisted, electric drive cooling system as in claim 1, wherein the electric motor means driving the fan structure is automatically shut off when said means for sensing coolant temperature registers a coolant temperature below a predetermined level.

3. An air-assisted, electric drive cooling system as in claim 1, wherein the means for gathering moving air includes at least one air inlet funnel which directs a flow of moving air over the second fan blades as the second fan blades move past a predetermined location.

4. The air-assisted electric drive cooling system of claim 3, wherein the air inlet funnel is arranged to provide laminar air flow therethrough at vehicle speeds above approximately 30 miles per hour.

5. An air-assisted, electric drive cooling system as in claim 3, wherein the inlet funnel has an extending shroud which partially envelopes the second fan blades to help force the moving gathered air over the second fan blades resulting in fan rotation.

6. An air-assisted, electric drive cooling system as in claim 1, wherein the means for gathering air to drive the second fan blades include at least two air inlet funneling means, each including at least a funnel section having a decreasing cross-sectional area, and each for providing a separate directed current of air over the second fan blades as such second blades pass a predetermined location, the air inlet funnel means and predetermined locations being arranged so as to provide a plurality of driving forces equiangularly disposed adjacent a periphery of the rotating second fan blades.

7. An air-assisted, electric drive cooling system as in claim 6, further comprising clutch means, mounted between the motor means and the fan means, for selectively engaging and disengaging the motor shaft from the fan structure.

8. An air-assisted, electric drive cooling system as in claim 7, further comprising switching means for selectively interrupting energization of the electric motor, thereby preventing rotation of the first fan blades by the motor shaft.

9. An air-assisted, electric drive cooling system as in claim 1, wherein the electric motor means comprises a two-speed electric motor.

10. An air-assisted, electric drive cooling system as in claim 7, wherein said clutch means further comprise a centrifugal clutch.

11. An air-assisted, electric drive cooling system as in claim 10, wherein said clutch means includes a one-way clutch wherein the clutch rotates freely in one direction.

12. An air-assisted, electric drive cooling system as in claim 7, wherein said clutch means further includes a one-way clutch wherein the clutch rotates freely in one direction.

13. In an automotive vehicle having an engine and a radiator for engine coolant, and a cooling fan structure including a fan member that is generally disposed between the engine and the radiator, a cooling system fan assembly, comprising:
    at least one rotatable fan member having a plurality of fan blades;
    air gathering means for collecting moving air and directing the moving air generally toward the plurality of fan blades in a laminar flow, said air gathering means including at least one funnel having a front section with an initial cross-sectional area and an end section with a final cross-sectional area smaller than the initial cross-sectional area and an elongated intermediate section of generally decreasing cross-sectional areas which tapers to provide a smooth path for the moving air to flow laminarly from the front section to the end section, said funnel being constructed such that its front section is disposed generally alongside of the radiator to receive moving air flowing past rather than through the radiator;
    shroud means, mounted and positioned at least in part concentrically about and spaced apart from the rotatable fan member, for helping direct the laminar flow of air collected by the air gathering means and exiting from the end section of the funnel into contact with the plurality of fan blades to cause rotation of the fan member.

14. A cooling system fan assembly for automotive vehicles, comprising:
    first and second fan members each having a plurality of fan blades;
    coupling means, centrally connected to the first fan member, for enabling the first and second fan members to be rotated by an electric motor; and
    the second fan member being located circumferentially around and rigidly interconnected to the first fan member, its fan blade members being arranged for rotation by a directed air current.

15. A cooling system fan assembly as in claim 14, further comprising:
    a shroud member at least partially surrounding the second fan member, arranged to confine a directed air current which contacts and pushes against the blades of said second fan member over a predetermined area of rotation of the second fan member, thereby helping cause the second fan member to rotate in response to the directed air current.

16. A cooling system fan assembly as in claim 13, wherein the air gathering means include a plurality of funnels.

17. A cooling system fan assembly as in claim 16, wherein the air gathering means include two funnels spaced apart equiangularly along the shroud means.

* * * * *

UNITED STATES PATENT AND TRADEMARK OFFICE
CERTIFICATE OF CORRECTION

PATENT NO. : 5,279,503
DATED : January 18, 1994
INVENTOR(S) : Verle Propst

It is certified that error appears in the above-indentified patent and that said Letters Patent is hereby corrected as shown below:

Column 2, line 12, replace "pumps" with --pump--.

Column 2, line 61, after "passes" insert --therethrough,--.

Column 3, line 3, after "rotating" insert --quickly--.

Column 11, line 36, after "384" delete "it".

Column 11, line 49, replace "a" with --at--.

Column 11, line 51, after "maximum cooling" insert --When the vehicle is--.

Column 11, line 54, after "the" insert --electric--.

Signed and Sealed this

Twenty-third Day of August, 1994

*Attest:*

BRUCE LEHMAN

*Attesting Officer*     *Commissioner of Patents and Trademarks*